United States Patent [19]

Sato

[11] 4,143,288
[45] * Mar. 6, 1979

[54] CORELESS MOTOR

[75] Inventor: Masaaki Sato, Hachioji, Japan

[73] Assignee: Olympus Optical Co., Ltd., Tokyo, Japan

[*] Notice: The portion of the term of this patent subsequent to Nov. 23, 1993, has been disclaimed.

[21] Appl. No.: 731,719

[22] Filed: Oct. 12, 1976

Related U.S. Application Data

[62] Division of Ser. No. 595,398, Jul. 14, 1975, Pat. No. 3,993,920.

[30] Foreign Application Priority Data

| Jul. 13, 1974 | [JP] | Japan | 49-83083 |
| Jul. 18, 1974 | [JP] | Japan | 49-85239 |
| Jul. 18, 1974 | [JP] | Japan | 49-85240 |
| Jul. 31, 1974 | [JP] | Japan | 49-91510 |
| Dec. 24, 1974 | [JP] | Japan | 49-3291 |

[51] Int. Cl.$^2$ ............................................. H02K 7/04
[52] U.S. Cl. ................... 310/66; 310/68 R; 310/154; 310/268
[58] Field of Search ............... 310/268, 237, 68, 83, 310/66, 67, 44

[56] References Cited

U.S. PATENT DOCUMENTS

| 3,090,880 | 5/1963 | Raymond | 310/237 X |
| 3,215,876 | 11/1965 | Nichols et al. | 310/268 X |
| 3,230,406 | 1/1966 | Henry-Baudot | 310/268 X |
| 3,231,807 | 1/1966 | Willis | 310/268 X |
| 3,312,846 | 4/1967 | Henry-Baudot | 310/268 X |
| 3,469,128 | 9/1969 | Cartier | 310/66 X |
| 3,892,986 | 7/1975 | Allen | 310/83 X |
| 3,993,920 | 11/1976 | Sato | 310/154 X |

Primary Examiner—Donovan F. Duggan
Attorney, Agent, or Firm—Flynn & Frishauf

[57] ABSTRACT

A coreless motor comprises a motor housing having a bearing, a rotor mounted within the housing, rotatably supported within the bearing and having a plurality of coils constituting a pancake coil, a permanent magnet stator mounted within the housing and disposed opposite to the rotor, in which the stator is arranged opposite to an effective coil section of the pancake coil and thus the rotor, and an annular spacing is formed opposite to an outer peripheral portion other than the effective coil section of the rotor so that a balance adjusting member for the rotor as well as an electrical part associated with the coreless motor can be provided in the annular spacing within the motor housing.

18 Claims, 24 Drawing Figures

CORELESS MOTOR

This is a division of application Ser. No. 595,398, filed July 14, 1975, now U.S. Pat. No. 3,993,920, issued Nov. 23, 1976.

BACKGROUND OF THE INVENTION

This invention relates to a coreless motor.

Recently, a coreless motor of the type in which a coreless rotor having a pancake coil on an insulating substrate in a one-layer or multi-layer fashion, has been developed. The rotor of this type is formed, for example, by printing a coil pattern, or attaching a coil pattern of electroconductive foil, onto a light-weight insulating coil such as synthetic resin etc. Since such coreless rotor is light in weight and small in inertial force, if it is used, for example, in a tape driving motor of a tape recorder calling for such features, a rise in the rotation of a capstan apindle during the starting of the motor as well as a rapid stopping of a tape in a desired position can be smoothly effected. However, if the center of gravity of the rotor is deviated due to, for example, the eccentricity of a rotor shaft, an irregular rotation of the rotor tends to occur to a great disadvantage. In order to compensate for such irregular rotation, an attempt is made to attach a balance weight on the rotor. In so doing, a clearance for the balance weight is provided between the rotor and a housing, thus making the housing bulkier.

An irregular rotation of the rotor often occurs due to, for example, a variation in input voltage to the motor. To avoid such disadvantage, a servo mechanism is provided by which the number of rotations of the rotor is controlled through its detection. The number of rotations of the rotor is normally detected by a permanent magnet mounted on the rotor and a detection coil mounted on that surface of the housing which oppositely faces the permanent magnet. This requires a spacing for such electrical parts or elements within the housing, resulting in a bulkier motor.

SUMMARY OF THE INVENTION

It is accordingly the object of this invention to provide a small-sized motor substantially free from any irregular rotation, which is capable of attaching an electrical part such as a balance weight, servo mechanism etc. within a motor housing.

According to this invention there is provided a coreless motor comprising a motor housing having a bearing, a rotor mounted within the housing, rotatably supported within the bearing and having a plurality of coil units attached on a rotor substrate, said plurality of coil units constituting a pancake coil, and a permanent magnet stator mounted within the housing and disposed opposite to the rotor, in which the stator is arranged opposite to an effective coil section of the pancake coil and thus the rotor and an annular spacing is formed opposite to an outer peripheral portion other than the effective coil section of the rotor so that a balance adjusting member for the rotor and an electrical part associated with the coreless motor can be provided in the annular spacing within the motor housing.

DETAILED DESCRIPTION OF THE INVENTION

A pancake coil on a coreless rotor has a portion not contributing to the generation of a rotational force of a rotor, even when the pole surface of a magnet stator is disposed opposite to the rotor. That is, during the rotation of the rotor the outer peripheral portion of the coil on the rotor does not cut the magnetic flux of a stator. Consequently, even if that outer peripheral portion of the stator which does not contribute to the generation of a rotational force of a rotor is cut off, the rotational force of the rotor is not lowered.

This invention is based on this discovery. That is, this invention is directed to obtaining a coreless motor substantially free from any irregular rotation by providing an annular spacing in a position opposite to an outer peripheral portion other than an effective coil section of the rotor and mouting an electrical part such as a balance weight, servo mechanism etc. in the annular spacing within a motor housing.

Figure 2:
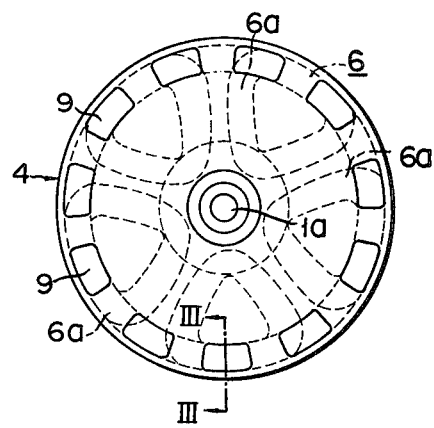
FIG. 2 is a plan view showing a rotor in FIG. 1.
Figure 3:
FIG. 3 is a fragmentary cross-sectional view showing the rotor as taken along line III—III in FIG. 2.

One embodiment of this invention will now be explained by reference to FIGS. 1 to 3.

Figure 1:
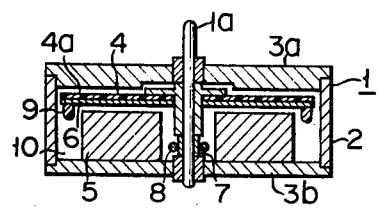
FIG. 1 is a cross-sectional view showing a coreless motor according to one embodiment of this invention.

As shown in FIG. 1, a motor housing 1 comprises a cylindrical side wall 2, and upper and lower plates 3a and 3b closing the upper and lower openings of the cylindrical side wall 2. Within the housing 1 are disposed a coreless rotor 4 and a magnet stator 5. The coreless rotor 4 is formed by bonding a pancake coil 6, to be later described, to the undersurface of a disc-like insulating substrate 4a made of a light-weight material such as synthetic resin etc. The rotor 4 is mounted within the housing 1 that it is penetrated at its center by a motor shaft 1a rotatably supported between the upper and lower plates 3a and 3b. On the stator side of the rotor 4 a pancake coil 6 is provided over the entire surface of the rotor with one coil pancake superposed on another. The coil 6 is arranged in a pattern as shown, for example, in FIG. 2 and consists of a plurality of coil units, for example, five coil units 6a, radially arranged with the motor shaft 1a as a center. A commutator 7 is mounted on the motor shaft 1a and a brush 8 is in contact with the outer periphery of the commutator 7. In forming the pancake coil 6, a plurality of balance adjusting projections or weights 9 made of, for example, synthetic resin are provided substantially at equal intervals around the entire peripheral portion of the rotor 4. The magnet stator 5 is made smaller in diameter than the rotor 4 such that it does not directly confront the entire outer peripheral portion of the rotor 4 i.e. it has a dimension corresponding to an effective coil portion of the rotor 4. As a result, an annular spacing 10 for receiving the balance adjusting projections 9 is defined by the cylindrical side wall 2, rotor 4 and magnet stator 5.

According to the above-mentioned embodiment, even if the pole surface of the magnet stator 5 does not confront the entire area of the pancake coil 6 on the rotor 4, i.e. it confronts only the effective portion of the pancake coil 6 and thus the rotor 4, the rotational force of the rotor 4 is not lowered. Furthermore, since the annular spacing is so provided within the motor housing 1 it is possible to accommodate the balance adjusting projections 9 in the annular spacing 10 within the motor housing. The balance adjustment of the rotor 4 can be easily effected by rotating the rotor on a balancing machine etc. and cutting away part or whole of that projection 9, by means of nippers, which is occupied at a heaviest position. As the projection 9 is formed integral with the rotor 4, it is not dropped inadvertently off the rotor 4 and thus it provides no obstacle to the rotation of the rotor 4. The cross-sectional shape of the annular spacing 10 may be suitably selected.

Figure 4:
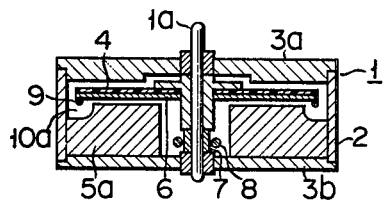
FIGS. 4 to 6, each, are a cross-sectional view showing a modification of FIG. 1.
Figure 5:
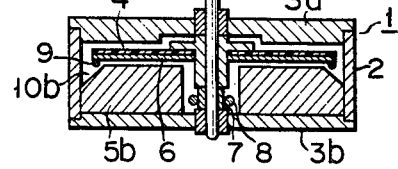

FIG. 4 shows an embodiment in which the entire outer peripheral portion of a magnet stator 5a which confronts the entire outer peripheral portion of a rotor 4 is curvilinearly cut out to provide an annular spacing 10a J-shaped in cross-section. FIG. 5 shows an embodiment in which the entire outer peripheral portion of a magnet stator 5b which faces the entire outer peripheral portion of a rotor 4 is bevelled to provide an annular spacing 10b V-shaped in cross-section. In the embodiments shown in FIGS. 1 to 3, like reference numerals are employed to designate like parts or elements.

Another embodiment using a cup type rotor will now be explained by reference to FIG. 6.

The cup type rotor has the advantage of increasing torque, in comparison with the flat type rotor, without increasing an inertia force. A motor housing 11 consists of a cylindrical wall surface 12, and front and rear plates 13a and 13b closing the front and rear openings of the cylindrical wall surface 12. Within the housing 11 are disposed a cup type coreless rotor 14 and a magnet stator 15. The rotor 14 is cylindrical in configuration and is disposed within the housing 11 with a slight clearance left relative to the cylindrical wall surface 12. One end portion of the stator 15 is mounted, through a flange-like boss 14a, on the motor shaft 11a. A pancake coil 16 is bonded to the inner surface of the rotor 14 and a plurality of balance adjusting projections 19 are provided substantially at equal intervals on the inner surface of the open end portion of the rotor 14. The magnet stator 15 has one end portion mounted on the inner surface of the rear plate 13b in a manner that the pole surface of the magnetic stator 15 confronts a pancake coil 16 bonded to the inner surface of the rotor 14. That entire outer peripheral portion of one end portion of the stator 15 which confronts the inner surface of the open end portion of the rotor 14 is bevelled to provide an annular air spacing 20 triangular in cross-section. A plurality of projections 19 are provided on the inner surface of the rotor 14 so as to be received in the annular spacing 20. A commutator 17 is fitted over the motor shaft 11a and a brush 18 is provided around, and in contact with, the commutator 17.

Even if in this embodiment the entire outer peripheral portion of one end portion of the stator 15 is so bevelled, the rotational force of the rotor 14 is not lowered. Consequently, a plurality of projections 19 can be received in the air spacing 20, thus making a motor compact.

Although in each of the above-mentioned embodiments the coil is bonded to the rotor, it is needless to say that the coil may be embedded in plastics support body using a molding machine.

Although in the embodiments of FIGS. 1 to 6 the balance weights are provided substantially at equal intervals on the entire outer peripheral portion of the rotor, they may be provided at any suitable places on the entire outer peripheral portion of the rotor. Although the above explanation is directed to the case where the balance weights are all of substantially equal size, this invention is not restricted to the above-mentioned embodiments. As shown, for example, in FIG. 7 the balance weight may be formed in an annular configuration on the entire outer peripheral portion of the rotor. In this case, the annular balance weight is cut off at any suitable place to adjust the balance of the rotor.

In this embodiment, the balance weight is provided in the annular spacing to which confronts the outer peripheral portion of the rotor within the housing of the coreless motor, thus offering a small-sized coreless motor substantially free of any irregular rotation. In the annular spacing are provided, in addition to the balance weight, component parts of a device for detecting the rotation speed of the rotor, and component parts of a servo system for controlling the rotation speed of the rotor in accordance with the output of the speed detector.

Figure 8:
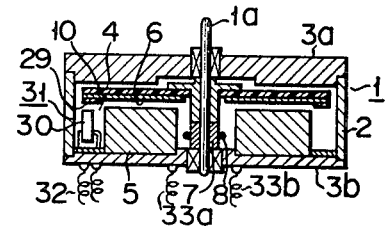
FIG. 8 is a cross-sectional view showing a coreless motor according to another embodiment of this invention.
Figure 9:
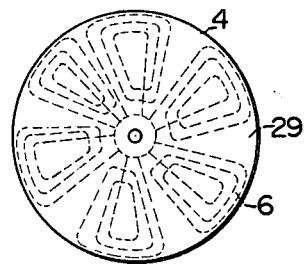
FIG. 9 is a plan view showing a pancake coil of a rotor in FIG. 8.
Figure 10:
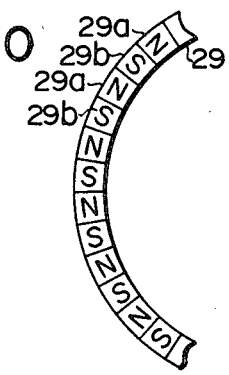
FIG. 10 is a fragmentary plan view showing an annular plural-pole permanent magnet attached on the rotor in FIG. 8.

FIG. 8 shows the case where component parts of a rotation speed detection device are provided in an annular spacing formed in a position opposite to the outer peripheral portion of a rotor. In the embodiment shown in FIGS. 1 to 3, like reference numerals are employed to designate parts or elements corresponding to those shown in FIGS. 1 to 3. In the Figure, an annular plural-pole magnetic member 29 is provided, as a position indicator, on that outer peripheral portion of the rotor which oppositely faces the annular spacing within the coreless motor. As shown in FIG. 9, the annular magnetic member 29 is attached on the outermost portion of six coil units 6 of a pancake coil, and N and S poles 29a and 29b are alternately arranged on the annular magnetic member 29. The magnetic member 29 is made of, for example, ferrite. A rotation speed signal generator 30 is attached on that inner surface of a lower plate of a housing which confronts, through the annular spacing 10, the outer peripheral portion of the rotor. The rotation speed signal generator 30 may be a print circuit board on which required parts including a pickup coil are attached. During the rotation of the rotor 4 a signal corresponding to each of the magnetic poles 29a and 29b is generated. The signal generator 30, together with the magnetic member 29, constitutes a rotation speed detector 31.

Figure 11:
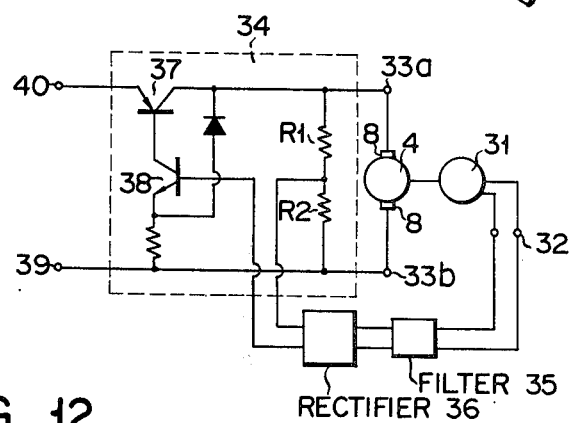
FIG. 11 is a circuit diagram showing a speed control circuit of the coreless motor in FIG. 8.

FIG. 11 is a circuit of the coreless motor of FIG. 8. The output of an amplifier 34 as provided separately from the coreless motor is coupled to input terminals 33a and 33b, between which a commutating brush 8 of the coreless motor is connected. The speed detection signal of the rotation speed detector 31 on the coreless motor is fed, through an output terminal 32 on the lower plate 3b of the housing, to a filter 35 where it is wave-shaped. The so wave-shaped signal is rectified, at a rectifier 36, into a DC current. The voltage of the DC signal is proportional to the rotation speed of the rotor 4. The detection DC signal is coupled to a junction of resistors $R_1$ and $R_2$ connected between the output terminals 33a and 33b of the amplifier 34, and also to the base of a control transistor 38 connected between the base of a main circuit transistor 37 and one of terminals of a DC power source. The emitter of the main circuit transistor 37 is connected to the other terminal of the DC power source.

When the output voltage of the rectifier 36 is increased with an increase in the rotational speed of the coreless motor, the base potential of the main circuit transistor 37 is raised to cause an amount of current to the coreless motor to be decreased. As a result, the number of rotation of the coreless motor is decreased. Where, on the other hand, the output voltage of the rectifier 36 is lowered with a decrease in the rotation speed of the coreless motor, an amount of current to the coreless motor is increased to cause the number of rotations of the coreless motor to be increased.

Although, in the embodiments shown in FIGS. 8 to 11, the amplifier 34, filter 35 and rectifier 36 are provided external to the coreless motor, these circuit elements 34, 35 and 36, together with the rotation speed detector 31, may be provided in the annular spacing 10 within the housing.

Figure 12:
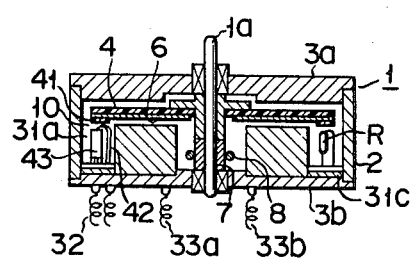
FIG. 12 shows a modification of FIG. 8.
Figure 13:
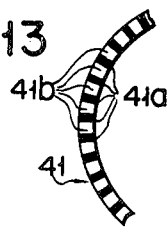
FIG. 13 is a fragmentary plan view showing a photoelectrical striped member attached on a rotor in FIG. 8.

As the rotation speed detector, use may be made of a photoelectric detector in place of the combination of a permanent magnet and pickup coil. FIGS. 12 and 13 show, by way of example, an embodiment incorporating such a photoelectric detector. In this embodiment, like reference numerals are employed to designate parts and elements corresponding to those shown in FIG. 8. In FIG. 12 a device 31a for photoelectrically detecting the rotation speed of the rotor comprises a striped annular member 41, a lamp 42 for emitting light on the striped annular member 41, and a phototransistor 43 adapted to receive a light reflected on the striped annular member and convert it into an electric signal. As shown in FIG. 13, black and white portions 41a and 41b are alternately arranged substantially at equal intervals on the striped annular member 41 attached on the outer peripheral portion of the rotor 4. When the rotor 4 is rotated, the intensity of the light reflected on the surface of the striped annular member 41 is varied due to the alternate black and white portions of the annular member 41. By the variation of the intensity of light, the output signal of the phototransistor 43 is valued correspondingly. The output signal of the phototransistor 43 may be fed, as the output of a rotation speed detector 31a, to the filter 35 as shown in FIG. 13.

The rotation speed detectors 31, 31a can be incorporated not only into a coreless motor including a flat type rotor 4, but also into a coreless motor including a cup type rotor 14.

Figure 6:
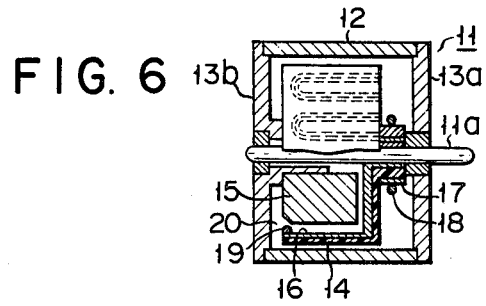
Figure 7:
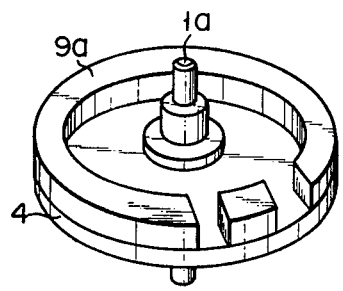
FIG. 7 is a cross-sectional view showing a rotor in a coreless motor according to another embodiment of this invention.
Figure 14:
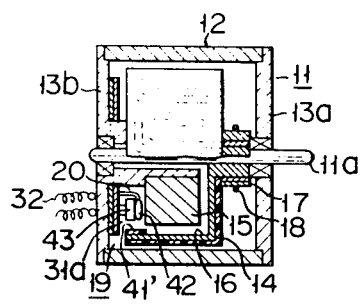
FIG. 14 is a cross-sectional view showing a coreless motor according to another embodiment of this invention.

In FIG. 14, like reference numerals are employed to designate like parts or elements corresponding to those shown in FIG. 6 and any further explanation is therefore omitted. It is to be noted, however, that in FIG. 14 a device 31a for photoelectrically detecting the rotation speed of a rotor comprises a lamp 42, phototransistor 43 and a striped annular member 41' attached on the inner edge portion of the open end portion of the rotor as in the case of FIG. 13. Like the embodiment in FIG. 8, a magnetic rotation speed detector can be incorporated in a coreless motor including a cup type rotor.

Figure 15:
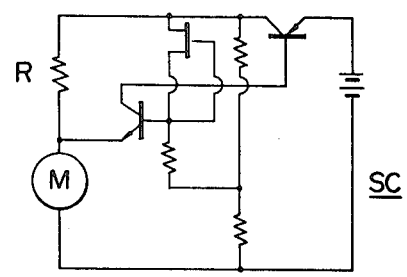
FIG. 15 is a circuit diagram showing, by way of example, a servo circuit of the coreless motor.

Although the above explanation is directed to providing the rotation speed detector 31a in the annular spacing 10, 20 within the coreless motor, a servo circuit SC connected to a coreless motor M as shown in FIG. 15 may be further provided in the annular spacing 10, 20 within the coreless motor. The servo circuit SC can be attached as shown, for example, in FIG. 12 by mounting a print circuit board 31c on that surface portion of the lower plate of the housing which confronts the annular spacing 10 within the coreless motor, and mounting on the circuit board 31c a resistor R connected to a motor M as shown, for example, in FIG. 15. Any other electrical component parts shown in FIG. 15 may be likewise mounted on the print circuit board.

Figure 16:
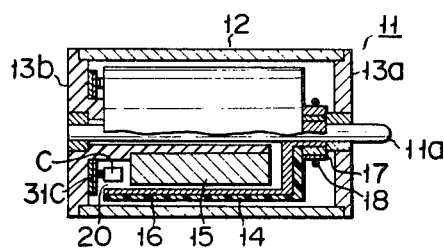
FIG. 16 is a cross-sectional view showing another embodiment of this invention, in which a cup type rotor is used.
Figure 17:
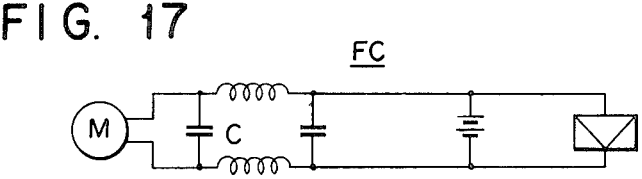
FIG. 17 is a circuit diagram showing a noise filter incorporated in the coreless motor.

FIG. 16 shows the case where a component part of the filter circuit FC as in FIG. 17 is provided in the annular spacing 20 within the housing. The component part, for example, a capacitor C in the filter circuit FC for eliminating the noise of the coreless motor is connected to a print circuit board 31c mounted in the annular spacing 20 within the housing. The other circuit components can likewise be connected to the print circuit board 31c. The other part of FIG. 16 is substantially the same as in FIG. 14.

In the present coreless motor particularly including a flat type rotor a distance between two bearings is small in comparison with the dimension of the rotor. Therefore, any slightest wear of the bearing causes the shaft of the rotor to be tilted to a greater extent. As a result, the rotor is brought into contact with the magnet stator or housing, thus either preventing a smooth rotation of the rotor or causing the rotation of the rotor to be stopped. During the manufacture of the coreless motor, alignment of the two bearings is difficult to make and requires a number of steps due to the housing as a bearing support being separately assembled. When the diameter of the shaft is reduced so as to make an axial friction smaller, a bearing loss can be minimized. However, distortion is liable to occur at the upper end portion of a shaft which supports an output transmission section, for example, a pulley portion, thus often failing to rotate the rotor smoothly.

The coreless motor according to this invention has an additional feature of including an improved bearing, as will be described below.

Figure 18:
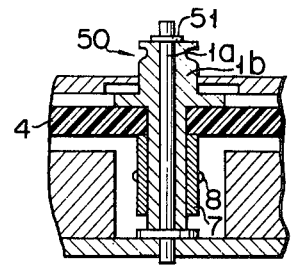
FIG. 18 is a cross-sectional view showing a coreless motor according to another embodiment of this invention.

In FIG. 18 a fixed main shaft 1a is supported in a cantilever fashion in the bottom surface of a motor housing 1. Fitted over the fixed main shaft 1a is a hollow shaft 1b on which is mounted a rotor 4. The rotor 4 is rotated under the coaction of a commutator 7, brush 8 and stator magnet 5. On the upper end of the hollow shaft 1b a pulley section 50 is integrally formed as an output section, and the upper end of the pulley section 50 is rotatably supported by a stop ring 51. As will be evident from this arrangement the hollow shaft 1b is rotated with the fixed main shaft 1a as an axis, and the axial bore of the shaft 1b serves as a bearing for the fixed shaft. As a result, the wear of the bearing due to the short distance between the two bearings and the attendant tilting of the rotor are not encountered in this embodiment. Furthermore, since the shaft is supported in a cantilever fashion, it is entirely unnecessary to effect alignment of both the bearings. In consequence, a number of steps required are omitted in the manufacture of the coreless motor, thus reducing a manufacturing cost. Since in this embodiment the fixed main shaft, though reduced in diameter so as to make an axial friction smaller, is supported within the hollow shaft up to its upper end, even if any force is applied to the output transmission section of the hollow shaft, no distortion occurs at the output transmission section.

Figure 19:
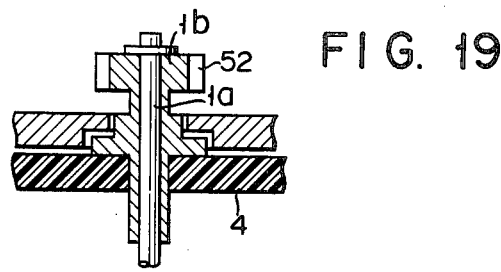
FIG. 19 is a fragmentary cross-sectional view showing a modification of FIG. 18.

FIG. 19 is a partially enlarged cross-sectional view showing a modification in which a gear section 52 is provided as an output transmission section in place of the pulley section 50 in FIG. 18. The coreless motor in FIG. 19 is similar in its construction and operation to that shown in FIG. 18 and any further explanation is, therefore, omitted. If the hollow shaft 1b is made of an oilless metal, polyacetal (Delrin) etc., it is unnecessary to lubricate oil into the axial bore of the shaft 1b. In this case, the hollow shaft 1b can be made, for example, using a mold i.e. witout resort to a cutting operation, thus making it possible to lower a manufacturing cost. Only that part which contacts with the bearing may be made of an oilless material.

A motor, particularly a coreless motor used in a tape recorder etc., is required to be rotated always at constant speed. To this end, a mechanical loss in the motor is maintained constant. In consequence, a brush and bearing of the motor are always required to have a certain load. The tape recorder, if it is of a portable or pocketable type, is varied in its direction with the resultant change in the position of the motor. As a result, the thrust of the bearing and its direction are varied due to the weight of the rotor. This leads to an irregular rotation of the motor i.e. wow, flutter etc. of the motor.

The other embodiments of this invention will be explained by reference to FIGS. 20 to 24.

Figure 20:
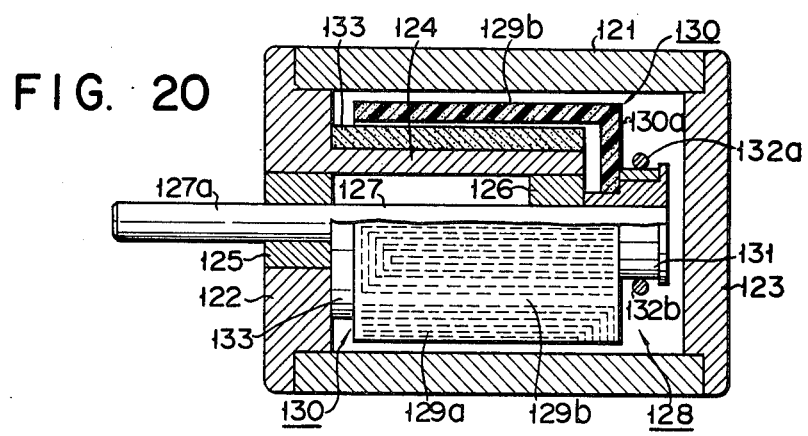
FIG. 20 is a horizontal coreless motor according to another embodiment of this invention.

FIG. 20 illustrates a horizontal type coreless motor. A housing 21 serves as a yoke, and the open ends of the housing 21 are closed by end plates 122 and 123, respectively. The end plate 122 is formed integral with a cylindrical bearing 124. A main shaft 127 is rotatably supported by bearings 125 and 126 which are fitted into the cylindrical bearing 124. An armature 128 is mounted on the main shaft 127 and mainly consists of a rotor 130 formed by supporting a coil 129a such as a copper coil etc. with a plastics support body 129b, and a commutator 131 mounted on the inner end portion of the main shaft 127 and over which the rotor 130 is integrally fitted. Brushes 132a and 132b are slidably engaged with the commutator 131 to permit the coil 129a to conduct. A permanent magnet 133 is fitted over the cylindrical bearing 124 in a manner that it is shifted somewhat leftward relative to the rotor 130. When the armature 128 is rotated in coaction with the permanent magnet 133, a rotational force is taken out at an output section 127a of the main shaft 127. Since in this embodiment a magnetic powder such as an iron powder etc. is added to the plastics support body 129b, the coreless armature 128 is attracted toward the permanent magnet 133, thus producing a leftward thrust.

Figure 21:
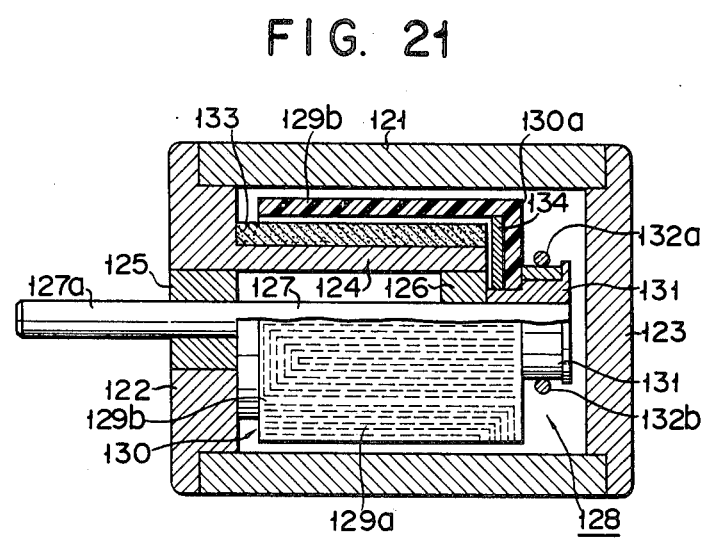
FIG. 21 is a cross-sectional view showing a modification of FIG. 20.

In the embodiment of FIG. 20 the center of a length of the coreless armature 128 is shifted relative to the center of a length of the permanent magnet 133, and an end surface 130a of the rotor 130 is also attracted toward the permanent magnet 133, thus producing a very effective leftward thrust. In this case, any consideration as to a rightward thrust is not necessary. FIG. 21 shows a modification in which a ferromagnetic disc 134 is bonded to an inner end surface 130a of a rotor 130 so as to produce a leftward thrust. As a means for adding a magnetic material to the armature, for example, a magnetic material may be added to the plastics support body or a ferromagnetic material may be attached in any suitable form to the rotor. In this embodiment, similar reference numerals are employed to designate parts or elements corresponding to those shown in FIG. 20 and any further explanation is, therefore, omitted.

Figure 22:
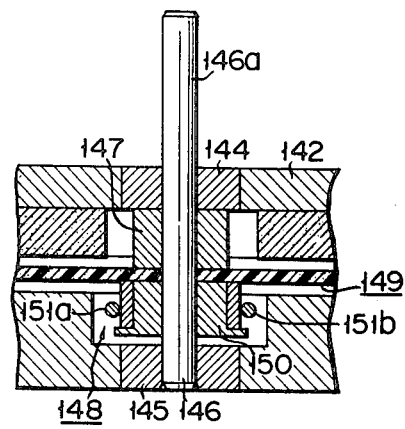
FIG. 22 is a cross-sectional view showing a coreless motor according to another embodiment of this invention.
Figure 23:
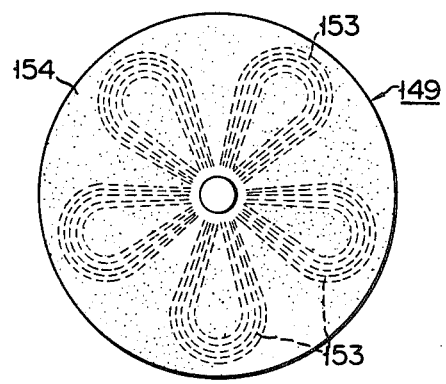
FIG. 23 is a plan view showing a rotor in FIG. 22.

FIG. 22 shows a flat type coreless motor. A housing 141 comprises a cylindrical side wall, and upper and lower end plates 142 and 143 closing the upper and lower openings of the cylindrical side wall and serving as a yoke. In the centers of the upper and lower end plates 142 and 143, bearings 144 and 145 are fitted, respectively and a main shaft 146 is rotatably supported within the bearings 144 and 145. Within the housing 141 and between the upper and lower bearings 144 and 145, a spacer ring 147 and armature 148 are fitted over the main shaft 146 with the spacer ring 147 at the upper side and the armature 148 at the lower side. The armature 148 comprises a rotor 149 and a commutator 150 integral with the rotor 149, both of which are fitted over the main shaft 146. Brushes 151a and 151b are slidably engaged with the commutator 150. A permanent magnet 152 associated with the rotor 149 is attached to the inner surface of the upper end plate 142 in a manner that it is situated above the rotor 149. As shown in FIG. 23, the rotor 149 is formed by supporting a coil 153 with a plastics support body 154. As in the case of FIGS. 20 and 21, a magnetic material is added to the plastics support body 154. In this case, the rotor 149 is attracted toward the permanent magnet 152, thus producing an upward thrust. The rotational force of the armature is taken out at an output section 146a of the main shaft 146.

Figure 24:
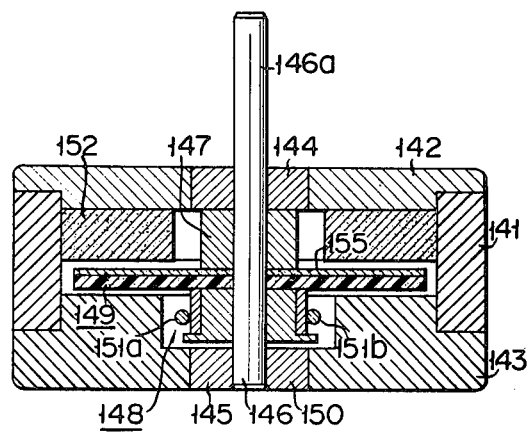
FIG. 24 is a cross-sectional view showing a coreless motor according to one embodiment of this invention.

FIG. 24 shows a modification of FIG. 22, in which a very thin disc 155 made of a ferromagnetic material is bonded to the upper surface of a rotor 149. In this case, a thrust acting in a predetermined direction can be obtained. A magnetic ring can be attached to the rotor 149 in place of the magnetic disc 155. The coreless motor shown in FIG. 24 is substantially similar in its construction and arrangement to that shown in FIG. 22 and any further exaplanation is, therefore, omitted.

As will be evident from the embodiments of FIGS. 20 and 22 as well as their modification figures 21 and 24, a very high performance motor, which is free from any irregular rotation and capable of obtaining a thrust acting always in a predetermined direction, can be obtained by adding a magnetic material to the coreless armature.

What is claimed is:

1. A coreless motor comprising:
   a motor housing having a bearing,
   a rotor mounted within the housing and rotatably supported within the bearing, said rotor having a plurality of coil units attached on a rotor substrate, said plurality of coil units comprising a pancake coil,
   a permanent magnet stator mounted within the housing and disposed opposite to the rotor, said stator being arranged opposite to an effective coil section of said pancake coil,
   an annular spacing within said motor housing formed opposite to an outer peripheral portion other than said effective coil section of said rotor, and a rotor balance adjusting member provided on that outer peripheral portion of said rotor which confronts said annular spacing within said housing.

2. A coreless motor according to claim 1, in which a plurality of balance weights are provided substantially at equal intervals on that outer peripheral portion of said rotor which confronts said annular spacing within said housing.

3. A coreless motor according to claim 1, in which an annular balance weight capable of being cutting off at any suitable place for balance adjustment is provided on that outer peripheral portion other than said effective coil section of said rotor which confronts said annular spacing within said housing.

4. A coreless motor according to claim 1, in which an annular plural-pole magnetic material is attached on that outer peripheral portion other than said effective coil section of said rotor which confronts said annular spacing within said housing, and a pickup coil is attached on that inner surface of said housing which confronts said magnetic material.

5. A coreless motor according to claim 1, in which a striped annular member is attached on that outer peripheral portion other than said effective coil section of said rotor which confronts said annular spacing within said housing, and a lamp and photoelectric element are attached on that inner surface of the housing which confronts said annular spacing within said housing.

6. A coreless motor according to claim 1, in which said rotor is mounted on a rotor shaft integral with a pulley as an output transmission section of said coreless motor.

7. A coreless motor according to claim 1, in which said rotor is mounted on a rotor shaft integral with a gear as an output transmission section of said coreless motor.

8. A coreless motor according to claim 6, in which at least that part of said rotor shaft contacts with a bearing is made of an oilless material.

9. A coreless motor according to claim 7, in which at least that part of said rotor shaft which confronts a bearing is made of an oilless material.

10. A coreless motor according to claim 1, in which a magnetic material is attached on said rotor so as to maintain thrust in a predetermined direction.

11. A coreless motor according to claim 10, in which said rotor substrate includes an insulating substrate containing a magnetic powder.

12. A coreless motor according to claim 10, in which said rotor is of a cut type and comprising a magnetic material attached on the inner bottom surface of said cup type rotor.

13. A coreless motor according to claim 1, in which an electrical part associated with said coreless motor is provided within said annular spacing.

14. A coreless motor comprising:
    a motor housing having a bearing,
    a rotor mounted within the housing and rotatably supported within the bearing, said rotor having a plurality of coil units attached on a rotor substrate, said plurality of coil units comprising a pancake coil,
    a permanent magnet stator mounted within the housing and disposed opposite to the rotor, said stator being arranged opposite to an effective coil section of said pancake coil, and
    an annular spacing within said motor housing formed opposite to an outer peripheral portion other than said effective coil section of said rotor and comprising means within said motor housing for receiving therein at least one of a balance adjusting member for said rotor and an electrical part associated with said coreless motor, and
    a plurality of balance adjusting weights provided in said annular spacing at substantially equal intervals on that outer peripheral portion of said rotor which confronts said annular spacing within said housing.

15. A coreless motor according to claim 14 comprising an electrical part associated with said coreless motor received in said annular spacing within said motor housing.

16. A coreless motor comprising:
    a motor housing having a bearing,
    a rotor mounted within the housing and rotatably supported within the bearing, said rotor having a plurality of coil units attached on a rotor substrate, said plurality of coil units comprising a pancake coil,
    a permanent magnet stator mounted within the housing and disposed opposite to the rotor, said stator being arranged opposite to an effective coil section of said pancake coil, and
    an annular spacing within said motor housing formed opposite to an outer peripheral portion other than said effective coil section of said rotor and comprising means within said motor housing for receiving therein at least one of a balance adjusting member for said rotor and an electrical part associated with said coreless motor, and
    an annular balance weight capable of being cut off at any suitable place for balance adjustment provided in said annular spacing on that outer peripheral portion other than said effective coil section of said rotor which confronts said annular spacing within said housing.

17. A coreless motor according to claim 16 comprising an electrical part associated with said coreless motor received in said annular spacing within said motor housing.

18. A coreless motor comprising:
    a motor housing having a bearing,
    a rotor mounted within the housing and rotatably supported within the bearing, said rotor having a plurality of coil units attached on a rotor substrate, said plurality of coil units comprising a pancake coil, a permanent magnet stator mounted within the housing and disposed opposite to the rotor, said stator being arranged opposite to an effective coil section of said pancake coil, an annular spacing within said motor housing formed opposite to an outer peripheral portion other than said effective coil section of said rotor and comprising means within said motor housing for receiving therein at least one of a balance adjusting member for said rotor and an electrical part associated with said coreless motor, an annular plural-pole magnetic material mounted on that outer peripheral portion other than said effective coil section of said rotor which confronts said annular spacing within said housing, and a pickup coil mounted on that inner surface of said housing which confronts said magnetic material.

* * * * *

UNITED STATES PATENT AND TRADEMARK OFFICE
CERTIFICATE OF CORRECTION

PATENT NO. : 4,143,288
DATED : March 6, 1979
INVENTOR(S) : Masaaki SATO

It is certified that error appears in the above—identified patent and that said Letters Patent are hereby corrected as shown below:

Column 10 (claim 12), line 2, change "cut" to --cup--.

Signed and Sealed this

Tenth Day of July 1979

[SEAL]

Attest:

LUTRELLE F. PARKER
Attesting Officer    Acting Commissioner of Patents and Trademarks